United States Patent
Nakagawara et al.

(10) Patent No.: US 9,871,975 B2
(45) Date of Patent: Jan. 16, 2018

(54) IMAGING APPARATUS AND CONTROL METHOD

(71) Applicant: CANON KABUSHIKI KAISHA, Tokyo (JP)

(72) Inventors: Naoyuki Nakagawara, Tokyo (JP); Atsushi Sugawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 14/692,005

(22) Filed: Apr. 21, 2015

(65) Prior Publication Data

US 2015/0312459 A1  Oct. 29, 2015

(30) Foreign Application Priority Data

Apr. 23, 2014 (JP) ................. 2014-089532

(51) Int. Cl.
*H04N 9/73* (2006.01)
*H04N 5/235* (2006.01)

(52) U.S. Cl.
CPC ......... *H04N 5/2353* (2013.01); *H04N 5/2357* (2013.01)

(58) Field of Classification Search
CPC .................................................. H04N 5/2357
USPC .......................................... 348/221.1, 226.1
See application file for complete search history.

(56) References Cited

U.S. PATENT DOCUMENTS

| 7,440,022 B2* | 10/2008 | Matsumoto | H04N 5/2351 348/296 |
| 2006/0152598 A1* | 7/2006 | Kawarada | H04N 5/23248 348/226.1 |
| 2007/0091201 A1* | 4/2007 | Sasaki | G03B 21/26 348/362 |
| 2010/0271538 A1* | 10/2010 | Indo | H04N 5/2357 348/362 |

FOREIGN PATENT DOCUMENTS

| CN | 1897651 A | 1/2007 |
| CN | 101394483 A | 3/2009 |
| EP | 2357794 A2 | 8/2011 |
| JP | 2006-222935 A | 8/2006 |
| JP | 2007-053742 A | 3/2007 |

* cited by examiner

*Primary Examiner* — Anthony J Daniels
(74) *Attorney, Agent, or Firm* — Canon USA, Inc. I.P. Division

(57) ABSTRACT

In one or more embodiments, exposure control of an image sensor is performed based on a movement characteristic of a shutter configured to be movable to a position at which the image sensor is shielded from light and to a position at which the image sensor is not shielded from light. A moving speed of the shutter may change during movement, and a light amount change characteristic of light from an object may be calculated by a calculation unit. In one or more embodiments, the calculation unit calculates a timing when a light from an object satisfies a predetermined condition.

22 Claims, 10 Drawing Sheets

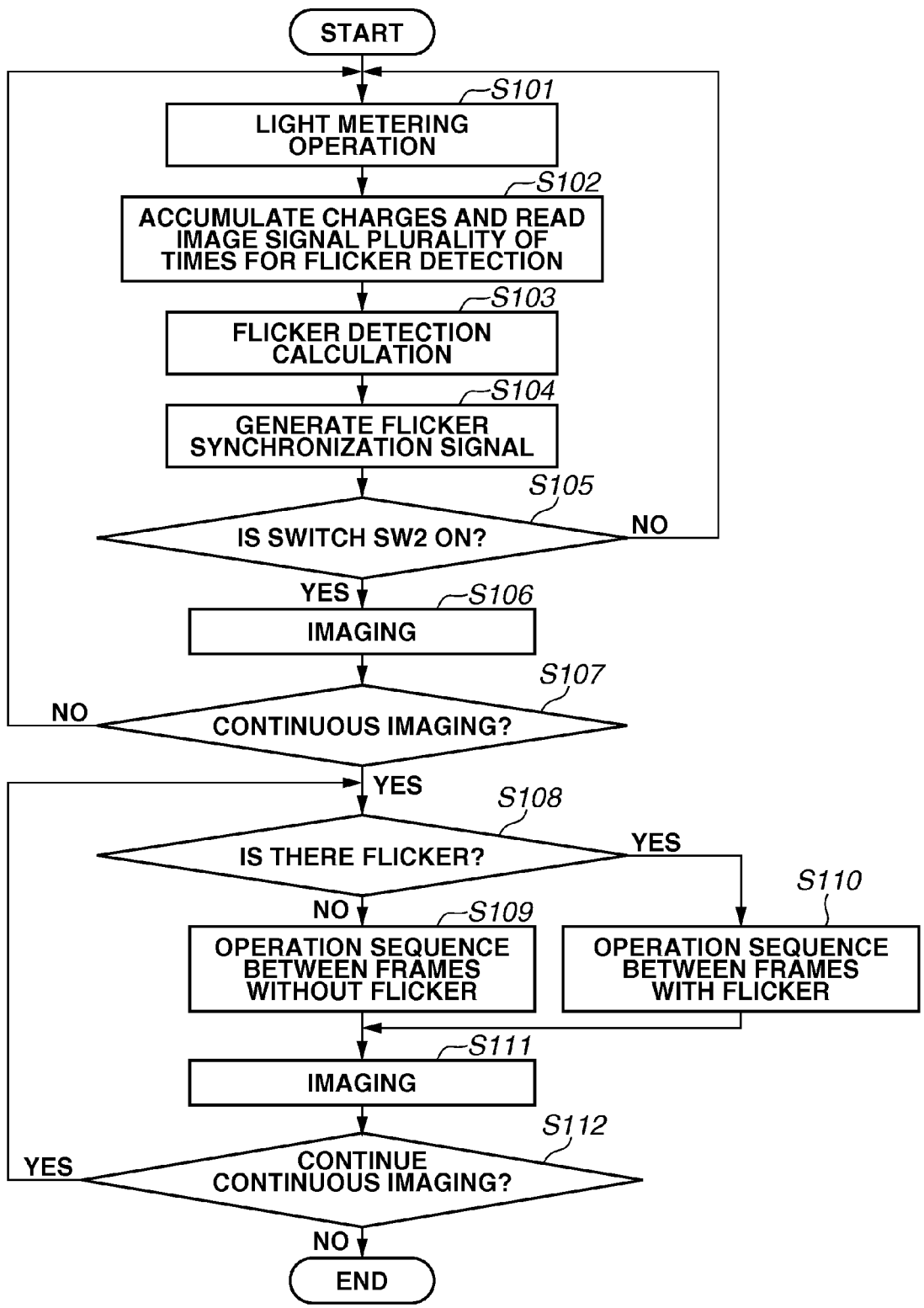

FIG.4

| NUMBER OF VERTICALLY-ADDED PIXELS | READ TIME (1-V TIME) |
|---|---|
| 1 (FULL-PIXEL READOUT) | 6.25 ms |
| 2 | 3.63 ms |
| 3 | 2.75 ms |
| 4 | 2.33 ms |
| 5 | 2.09 ms |
| 6 | 1.90 ms |
| 7 | 1.81 ms |
| 8 | 1.73 ms |
| 9 | 1.66 ms |
| 10 | 1.62 ms |

FIG.7

| SHUTTER SPEED | T_ShutterWait |
|---|---|
| 1/125 ~ 1/160 | 0 ms |
| 1/161 ~ 1/200 | 1.5 ms |
| 1/201 ~ 1/250 | 2 ms |
| 1/251 ~ 1/500 | 3 ms |
| 1/501 ~ 1/1000 | 3.5 ms |
| 1/1001 ~ 1/2000 | 3.75 ms |
| 1/2001 ~ | 4 ms |

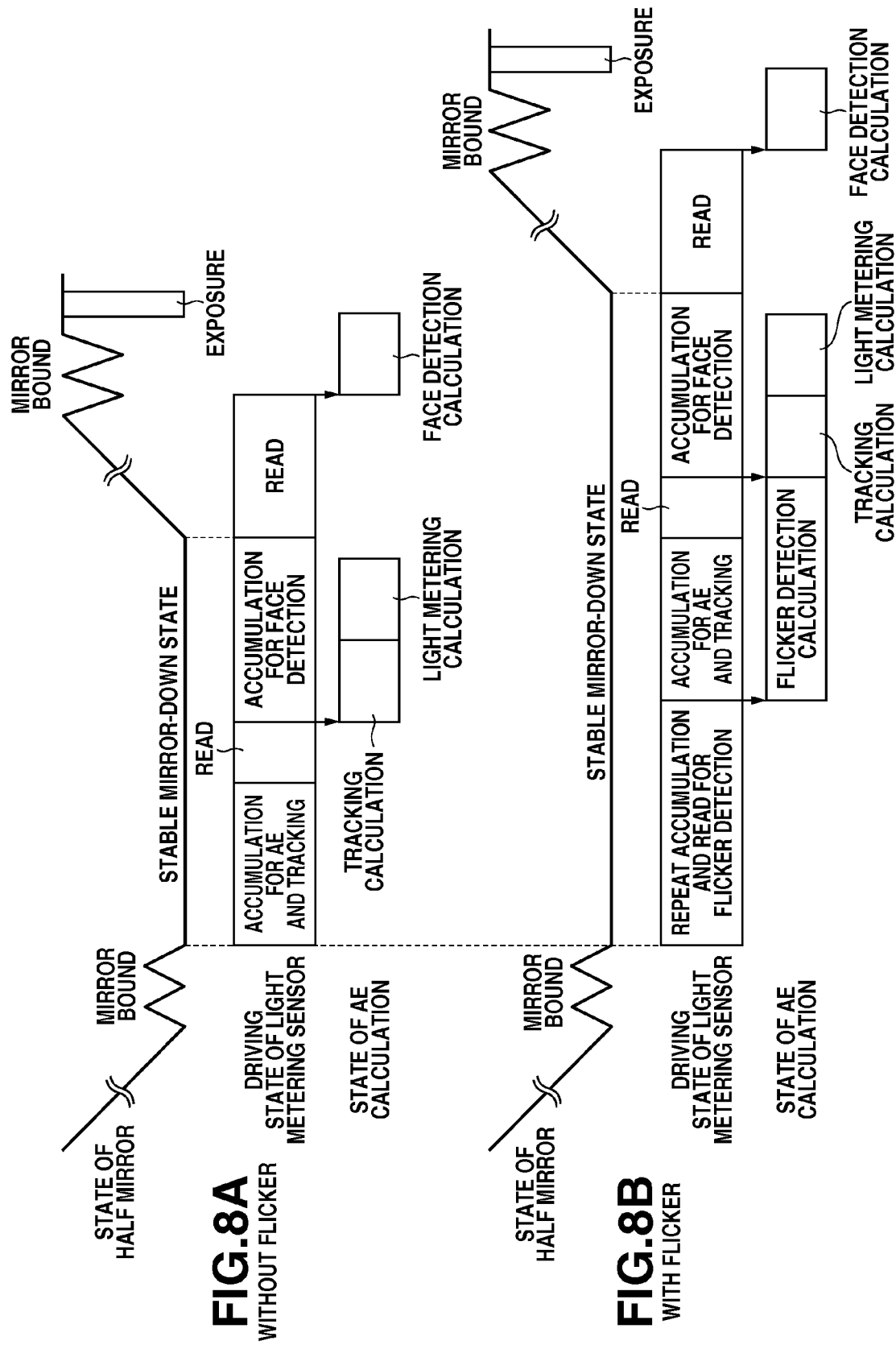

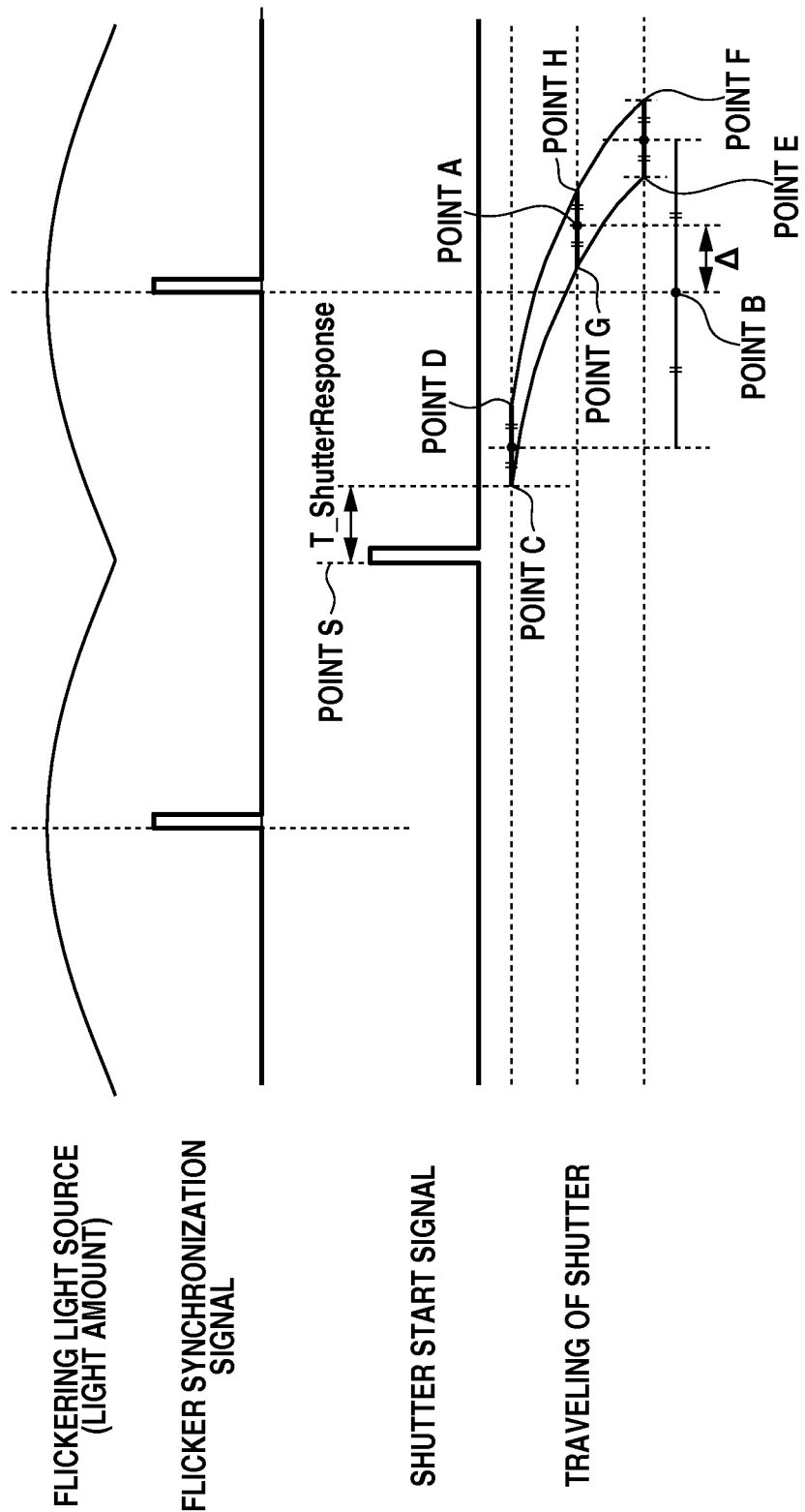

IMAGING APPARATUS AND CONTROL METHOD

BACKGROUND OF THE INVENTION

Field of the Invention

The present inventions relate to at least one imaging apparatus and at least one control method, and more particularly to at least one technique for suppressing influence of flicker that occurs under an artificial light source, such as a fluorescent lamp.

Description of the Related Art

Imaging apparatuses such as a digital camera and a mobile phone have recently been improving in sensitivity. This has made it possible to perform imaging at high shutter speed (short exposure time) and to obtain bright images with less blur even under a relatively dark environment.

Fluorescent lamps are prevalent as indoor light sources. Fluorescent lamps produce flicker, a phenomenon in which the illumination light fluctuates periodically, due to influence of a commercial power supply frequency. If imaging is performed at high shutter speed under such a light source that produces flicker (hereinafter, referred to as a flickering light source), exposure nonuniformity and/or color nonuniformity can occur in an image. Exposure and/or color temperature variations can occur between a plurality of images continuously captured.

Japanese Patent Application Laid-Open No. 2006-222935 discusses a technique for detecting a state of flicker of illumination light and adjusting imaging timing so that the center of exposure time substantially coincides with timing when a light amount of the illumination light shows a maximum value.

In Japanese Patent Application Laid-Open No. 2006-222935, an exposure start time is discussed to be adjusted so that the maximum value of the illumination light amount and the center of the exposure period substantially coincide with each other. However, a specific method thereof is not discussed. If the exposure start time is not able to be appropriately adjusted to an imaging condition, a favorable image cannot be obtained.

SUMMARY OF THE INVENTION

The present inventions are directed to at least one technique capable of obtaining a favorable image even if imaging is performed under a light source that produces flicker.

According to an aspect of at least one embodiment of the present inventions, at least one imaging apparatus includes an image sensor, a shutter configured to be movable to a position at which the image sensor is shielded from light, and to a position at which the image sensor is not shielded from light, wherein a moving speed of the shutter changes during movement, a calculation unit configured to calculate a light amount change characteristic of light from an object, and a control unit configured to perform exposure control of the image sensor based on a movement characteristic of the shutter and the light amount change characteristic calculated by the calculation unit. In one or more embodiments, a calculation unit may calculate a timing when a light from an object satisfies a predetermined condition.

According to other aspects of the present inventions, one or more imaging apparatuses and one or more control methods are discussed herein. Further features of the present inventions will become apparent from the following description of exemplary embodiments with reference to the attached drawings.

BRIEF DESCRIPTION OF THE DRAWINGS

FIG. 2 is a flowchart illustrating an operation of the imaging apparatus according to the exemplary embodiment of the present inventions for performing imaging with a reduced influence of flicker.

FIG. 4 is a table illustrating a relationship between the number of vertically added pixels and read time.

FIG. 7 is a table in which values of T_ShutterWait and values of a shutter speed are associated with each other.

FIGS. 8A and 8B are diagrams illustrating an operation sequence of a light metering sensor 108 and a central processing unit for image processing and calculation (ICPU) 112 between frames of continuous imaging.

FIG. 10 is a diagram illustrating a relationship between the light amount change of the flickering light source and the generation timing of the flicker synchronization signal and the shutter start signal.

DESCRIPTION OF THE EMBODIMENTS

Various exemplary embodiments, features, and aspects of the inventions will be described in detail below with reference to the drawings.

Figure 1:
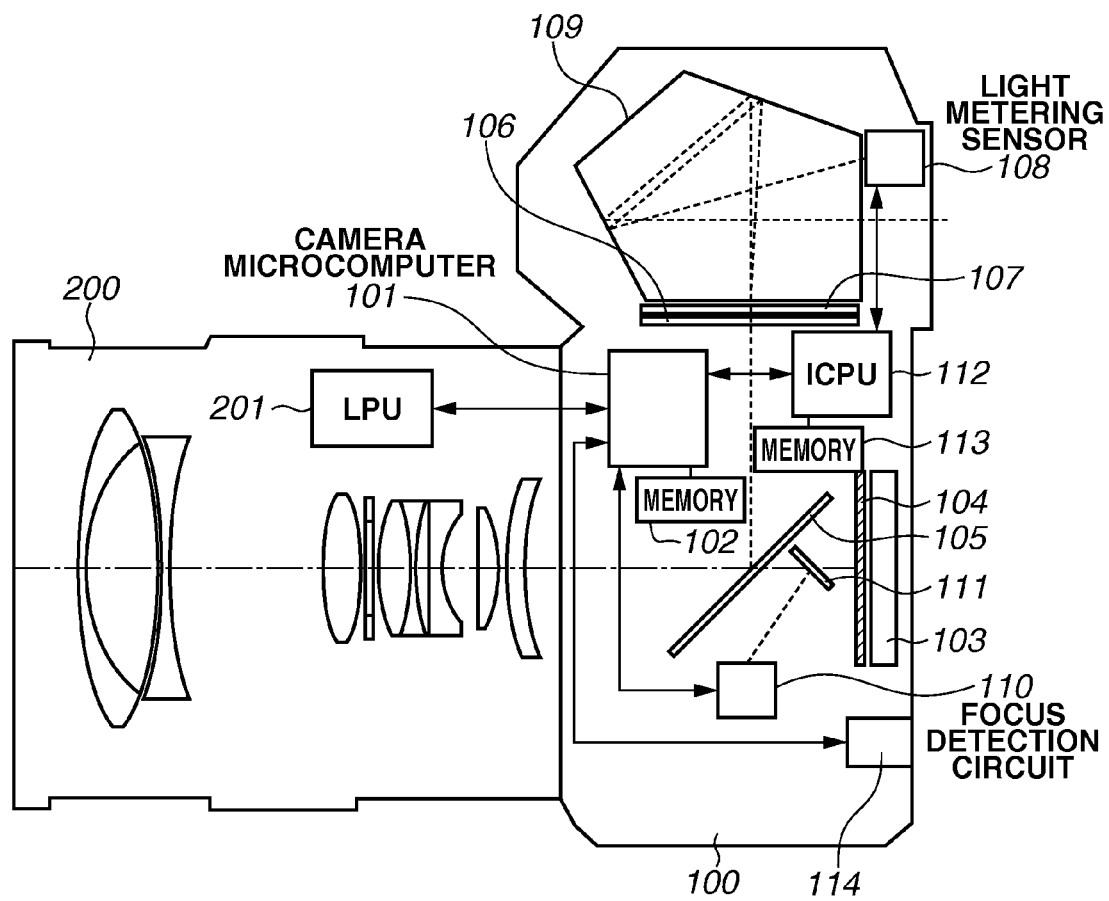
FIG. 1 is a schematic configuration diagram illustrating an imaging apparatus according to an exemplary embodiment of the present inventions.

FIG. 1 is a schematic configuration diagram of an imaging apparatus according an exemplary embodiment of the present inventions. The imaging apparatus according to the present exemplary embodiment includes a camera main body 100 and a lens unit 200 that is detachable and attachable to the camera body 100.

A configuration of the camera main body 100 will initially be described. A microcomputer central processing unit (CPU) (hereinafter, camera microcomputer) 101 controls respective parts of the camera main body 100. A memory 102 is a memory connected to the camera microcomputer 101. Examples of the memory 102 include a random access memory (RAM) and a read-only memory (ROM).

An image sensor 103 is a charge-coupled device (CCD) or complementary metal-oxide-semiconductor (CMOS) image sensor including an infrared cut filter and a low-pass filter. The image sensor 103 photoelectrically converts a light flux incident via the lens unit 200 to output an image signal.

A shutter 104 operates to take a light-shielding state to shield the imaging sensor 103 from the light flux incident via the lens unit 200, and a retracted state to guide the light flux incident via the lens unit 200 to the image sensor 103. In other words, the shutter 104 can be moved to a position to shield the image sensor 103 from light and a position not to shield the image sensor 103 from light.

A half mirror 105 can be moved to a position (mirror-up state) to guide the light flux incident via the lens unit 200 to the image sensor 103, and a position (mirror-down state) to guide the light flux to a light metering sensor 108. In other words, the half mirror 105 changes an optical path of the light flux incident via the lens unit 200 to a state where to guide the light flux to the image sensor 103 and a state where to guide the light flux to the light metering sensor 108. If the half mirror 105 is in the position in which to guide the light flux to the light metering sensor 108, the half mirror 105 focuses the light flux incident via the lens unit 200 onto a focusing screen 106.

A display device 107 is one using a polymer network (PN) liquid crystal. The display device 107 displays a frame (automatic focusing (AF) frame) indicating a focus detection area used for AF control. The light metering sensor 108 uses a charge accumulation type image sensor that accumulates charges according to the amount of incident light. Examples include CCD and CMOS image sensors. By employing such a light metering sensor, not only light metering but also face detection of an object, object tracking, and flicker detection can thus be performed based on an image signal output from the light metering sensor 108. A pentagonal prism 109 guides the light flux incident via the lens unit 200, reflected by the half mirror 105, to the light metering sensor 108 and an optical viewfinder (not illustrated). A focus detection circuit 110 performs focus detection for AF control. An AF mirror 111 guides part of the light flux incident via the lens unit 200, passed through the half mirror 105, to the focus detection circuit 110.

A central processing unit 112 performs drive control of the light metering sensor 108, image processing, and calculation (hereinafter, referred to as an ICPU). The ICPU 112 performs various calculations related to light metering, face detection of an object, and object tracking based on an output signal (image signal) from the light metering sensor 108. The ICPU 112 calculates light amount change characteristics based on the output signal (image signal) from the light metering sensor 108. The light amount change characteristics include a light amount change cycle of light from an object and timing when a light amount satisfies a predetermined condition (for example, timing when the light amount becomes maximum and timing when the light amount becomes minimum). A memory 113 is connected to the ICPU 112. Examples of the memory 113 include a RAM and a ROM. In the present exemplary embodiment, the camera main body 100 is described to include the ICPU 112 aside from the camera microcomputer 101. However, the camera main body 100 may be configured in such a manner that the processing to be performed by the ICPU 112 is performed by the camera microcomputer 101.

An operation unit 114 includes a release button and a setting button. The release button is intended for the user to instruct the camera main body 100 to start an imaging preparation operation and start an imaging operation. The setting button is intended for the user to make various settings of the camera main body 100. The operation unit 114 also includes a power switch, a mode dial, and a touch panel. The power switch is intended for the user to power on/off the camera main body 100. The mode dial is intended for the user to select an operation mode of the camera main body 100 from a plurality of modes.

Next, a configuration of the lens unit 200 will be described. A lens CPU 201 (hereinafter, referred to as an LPU) controls each part of the lens unit 200, such as a focus lens, a zoom lens, and a drive unit of a diaphragm. The LPU 201 transmits information about the lens unit 200 to the camera microcomputer 101.

Next, an operation for performing imaging with a reduced influence of flicker will be described with reference to FIG. 2. FIG. 2 is a flowchart illustrating the operation of the imaging apparatus according to the present exemplary embodiment for performing imaging with a reduced influence of flicker.

The user operates the power switch to power on the camera main body 100. In step S101, the ICPU 112 performs a light metering operation. In the light metering operation, the light metering sensor 108 accumulates charges and reads an image signal. Based on the obtained image signal, the ICPU 112 performs a calculation related to light metering (hereinafter, referred to as a light metering calculation) to obtain a light metering value.

In the light metering operation, an accumulation time of the light metering sensor 108 may be desirably set to approximately an integer multiple of a cycle of flicker so that the light metering value, even under a flickering light source, does not vary due to a light amount change of the flickering light source. A frequency at which the light amount of the flickering light source changes (hereinafter, referred to as a flicker frequency) is twice the commercial power supply frequency. In a region where the commercial power supply frequency is 50 Hz, the flicker frequency is 100 Hz. The light amount change cycle is the reciprocal of the flicker frequency, i.e., 10 ms. Similarly, in a region where the commercial power supply frequency is 60 Hz, the flicker frequency is 120 Hz. The light amount change cycle is the reciprocal of the flicker frequency, i.e., 8.33 ms.

To accommodate the two flicker frequencies, the accumulation time of the light metering sensor 108 is set to time approximately equal to an average of 10 ms and 8.33 ms, such as 9 ms. Consequently, the accumulation time of the light metering sensor 108 becomes approximately equal to one cycle of the light amount change of the flickering light source regardless of whether the commercial power supply frequency is 50 Hz or 60 Hz. A stable light metering value can thus be obtained even under the flickering light source.

Based on the obtained light metering value, the camera microcomputer 101 determines an aperture value Av, a shutter speed (exposure time) Tv, and an International Organization for Standardization (ISO) speed (imaging sensitivity) Sv, which serve as exposure control values. When determining Av, Tv, and Sv, the camera microcomputer 101 uses program diagrams previously stored in the memory 102.

In step S102, as illustrated in FIG. 3, accumulation of charges by the light metering sensor 108 and the image signal reading are performed a plurality of times for flicker detection. FIG. 3 is a diagram illustrating accumulation timing of charges and reading timing of the image signal for flicker detection. The accumulation and reading are performed 12 times in succession at 600 fps, in cycles of approximately 1.667 ms. The value of 600 fps is equal to the least common multiple of the presumed flicker frequencies (100 Hz and 120 Hz). Performing accumulation 12 times at 600 fps adds up to a period of 20 ms of accumulation. Whether the commercial power supply frequency is 50 Hz or 60 Hz, the period of 20 ms covers two cycles of the light amount change of the flickering light source.

A method for driving the light metering sensor 108 at 600 fps (in cycles of 1.667 ms) will be described.

In the present exemplary embodiment, not only light metering but also face detection of an object, object tracking, and flicker detection are performed based on the image signal output from the light metering sensor 108. To accurately perform the face detection of an object, the light metering sensor 108 needs to have a considerable number of pixels, such as equivalent to the Quarter Video Graphics Array (QVGA). To read all the pixel signals of such an image sensor having the number of pixels capable accurately performing face detection of an object at a frame rate of 600 fps or higher would complicate the circuit configuration and increase cost.

If the image signal is intended for the face detection of an object, all the pixel signals are read from the light metering sensor 108. If the image signal is intended for flicker detection, pixel addition readout or thinning readout is performed to adjust the frame rate to 600 fps (cycles of 1.667 ms).

If a CCD image sensor is used as the light metering sensor 108, the pixel signals can be added and read using the pixel addition readout, whereby the number of read lines is apparently reduced to reduce read time. For example, if the CCD image sensor has a pixel array of stripe configuration, vertical pixel addition produces the effect of reducing the read time as illustrated in FIG. 4. FIG. 4 is a table illustrating a relationship between the number of vertically-added pixels and the read time. A description will be given by using as an example a CCD image sensor that has a read time of 6.25 ms when all the pixel signals are read without the addition of the pixel signals (the number of vertically-added pixels is one). With the CCD image sensor having the characteristic illustrated in FIG. 4, the addition of nine pixels provides a read time of 1.66 ms, which enables a frame rate of approximately 600 fps. The image signal read here has pixels vertically ⅑ as many as those of the image signal read without the addition of the pixel signals. Since flicker detection only compares the light metering values between image signals, the image signal with a reduced number of pixels in the vertical direction is sufficient.

If a CMOS image sensor is used as the light metering sensor 108, the horizontal lines for reading the image signal can be limited for thinning readout, whereby a total time of the accumulation and reading is adjusted to a cycle of approximately 1.667 ms.

This is the end of the description of the method for driving the light metering sensor 108 at approximately 600 fps (in cycles of approximately 1.667 ms). However, the foregoing accumulation and reading cycles of the light metering sensor 108 are just an example. The frame rate may be other than approximately 600 fps (cycles of approximately 1.667 ms). For example, the longer the accumulation time, the more effective it is for a low-light intensity environment. One accumulation time may thus be made longer than approximately 1.667 ms, and the frame rate may be lower than 600 fps. The shorter the accumulation and reading cycle, the shorter the time needed for flicker detection. One accumulation time may thus be made shorter than approximately 1.667 ms. The number of vertically-added pixels may be set to make the read time shorter than 1.66 ms so that the frame rate becomes higher than 600 fps. The relationship between the number of vertically-added pixels and the read time illustrated in FIG. 4 is also just an example. The more different the frame rate is from 600 fps, the greater the deviation between the accumulation and reading cycle of the light metering sensor 108 and the light amount change cycle of the flickering light source. Frame rates within the range of 600 fps±1% to 2% are therefore desirable. In other words, the light metering cycle of the light metering sensor 108 may desirably be approximately equal to the reciprocal of the least common multiple of a frequency twice a first commercial power supply frequency and a frequency twice a second commercial power supply frequency.

After the accumulation of charges and the reading of the image signal for flicker detection are ended in step S102, then in step S103, the ICPU 112 performs a flicker detection calculation based on the read image signal.

Figure 3A:
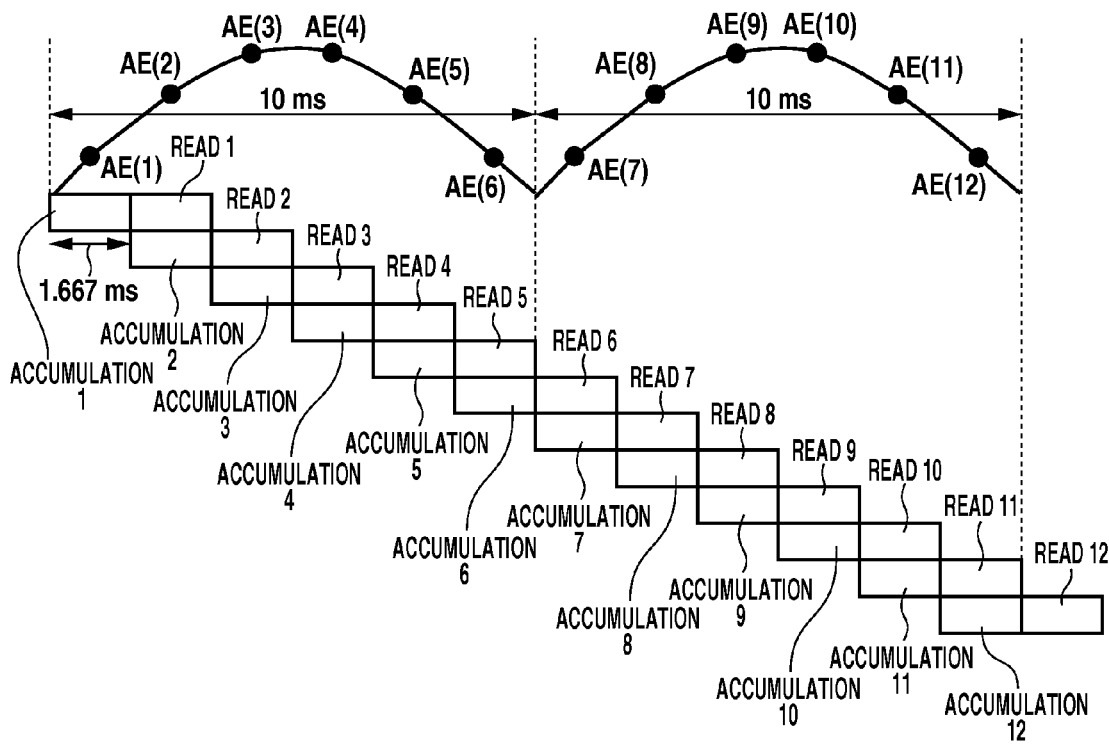
FIGS. 3A and 3B are diagrams illustrating accumulation timing of charges and reading timing of an image signal for flicker detection.

FIG. 3A illustrates the accumulation timing of charges, the reading timing of the image signal, and transition of the light metering value when the commercial power supply frequency is 50 Hz. The nth accumulation is referred to as "accumulation n", reading of the accumulation n as "read n", and the light metering value obtained from a result of the read n as "AE(n)". The number of light metering values obtained by each accumulation is one, whereas the light amount of the flickering light source is not constant even during the accumulation period. The light metering value obtained by each accumulation is thus regarded as a value corresponding to the light amount of the flickering light source at a center point in time in each accumulation period.

When the commercial power supply frequency is 50 Hz, the light amount change cycle of the flickering light source is approximately 10 ms. Since $10 \div 1.667 \approx 6$, accumulation is performed in every six cycles as illustrated in FIG. 3A at which timing the light amount of the flickering light source becomes approximately the same. In other words, there holds a relationship of $AE(n) \approx AE(n+6)$.

Figure 3B:
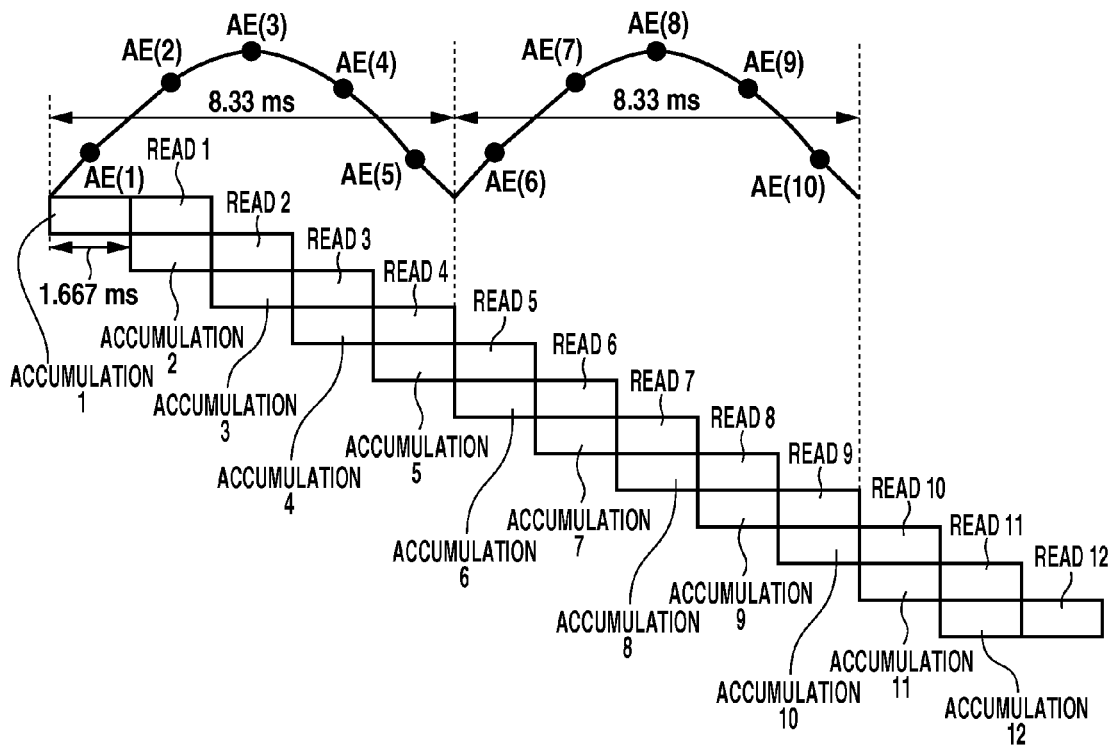

Similarly, when the commercial power supply frequency is 60 Hz, the light amount change cycle of the flickering light source is approximately 8.33 ms. Since $8.33 \div 1.667 \approx 5$, accumulation is performed in every five cycles as illustrated in FIG. 3B at which timing the light amount of the flickering light source becomes approximately the same. In other words, there holds a relationship of $AE(n) \approx AE(n+5)$.

Under a light source having no light amount change, $AE(n)$ remains approximately the same regardless of n. Based on a plurality of light metering values obtained by performing the accumulation for flicker detection, the ICPU 112 calculates evaluation values by using the following equations (1) and (2).

$$F50 = \sum_{n=1}^{6} |AE(n) - AE(n+6)|, \text{ and} \quad (1)$$

$$F60 = \sum_{n=1}^{6} |AE(n) - AE(n+5)|. \quad (2)$$

The evaluation value calculated by using equation (1) is denoted by F50. The evaluation value calculated by using equation (2) is denoted by F60. The ICPU 112 performs flicker detection by comparing the evaluation values F50 and F60 with a predetermined threshold F_th. More specifically, if F50<F_th and F60<F_th, the plurality of light metering values obtained by performing the accumulation for flicker detection is considered to be approximately equal. In such a case, the ICPU 112 determines that there is no flicker. If F50<F_th and F60≥F_th, the plurality of light metering values obtained by performing the accumulation for flicker detection is considered to have approximately equal values in every six cycles and not in every five cycles. In such a case, the ICPU 112 determines that there is flicker with a light amount change cycle of 10 ms (under a flickering light source with a commercial power supply frequency of 50 Hz).

If F50≥F_th and F60<F_th, the plurality of light metering values obtained by performing the accumulation for flicker detection is considered to have approximately equal values in every five cycles and not in every six cycles. The ICPU 112 therefore determines that there is flicker with a light amount change cycle of 8.33 ms (under a flickering light source with a commercial power supply frequency of 60 Hz).

During the accumulation for flicker detection, the imaging apparatus may be moved by panning, and accordingly the object may also move. The light metering value can thus change greatly so that F50≥F_th and F60≥F_th. In such a case, the ICPU 112 compares F50 and F60 for flicker detection.

More specifically, if F50≥F_th, F60≥F_th, and F50≤F60, the ICPU 112 determines that there is flicker with a light amount change cycle of 10 ms (under a flickering light source with a commercial power supply frequency of 50 Hz). On the other hand, if F50≥F_th, F60≥F_th, and F50>F60, the ICPU 112 determines that there is flicker with a light amount change cycle of 8.33 ms (under a flickering light source with a commercial power supply frequency of 60 Hz). In addition, if F50≥F_th, F60≥F_th, and F50=F60, the ICPU 112 is not able to determine the light amount change cycle of the flickering light source. The ICPU 112 may therefore determine that there is no flicker or that flicker is not detectable.

The ICPU 112 has been described to determine the light amount change cycle of the flickering light source if F50≥F_th and F60≥F_th. However, if F50≥F_th and F60≥F_th, the accumulation for flicker detection may be performed again since the accuracy of the flicker detection is low.

Figure 5:
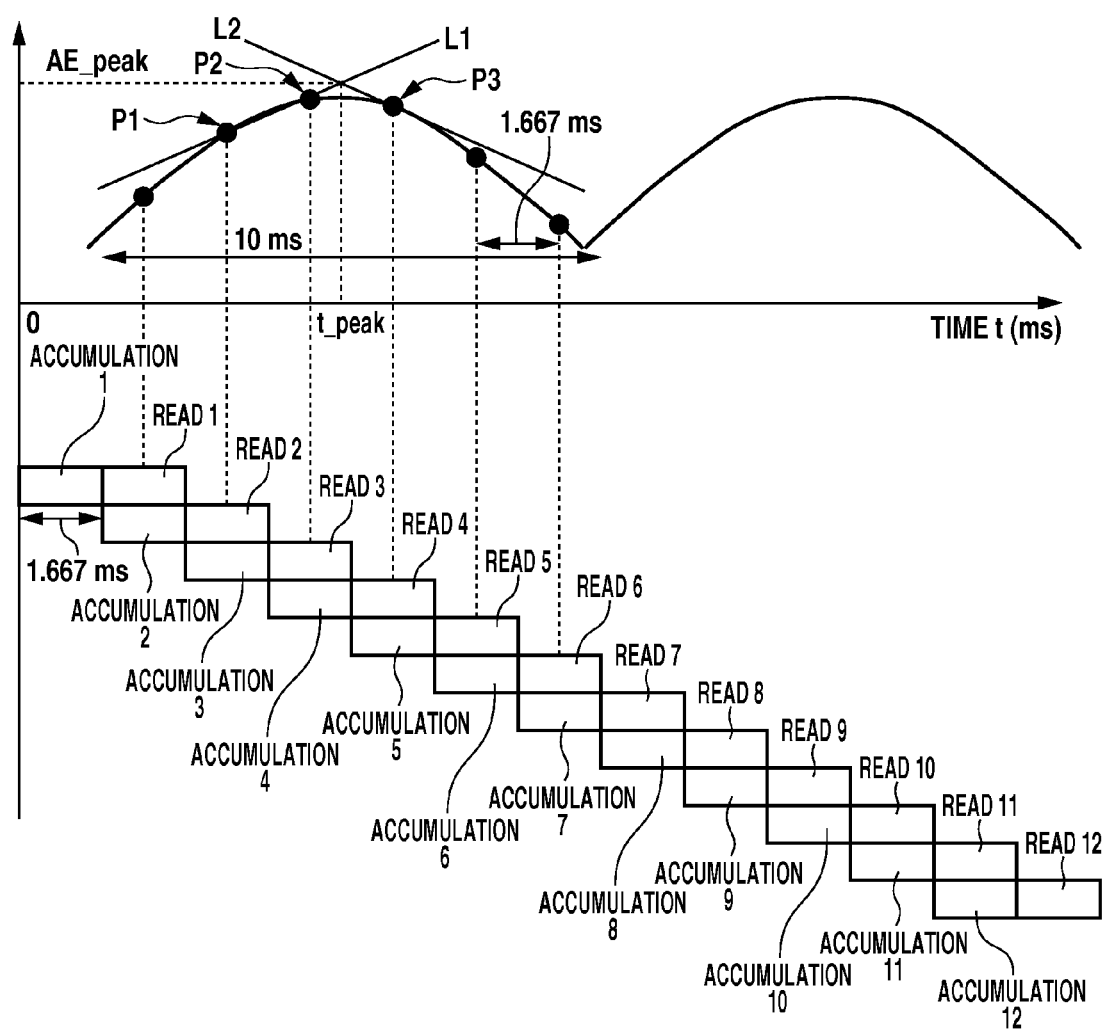
FIG. 5 is a diagram illustrating an example of a method for calculating timing of a peak of a light amount of a flickering light source.

In step S103, if the imaging apparatus is under a flickering light source, the ICPU 112 determines the timing of a feature point of the flicker. FIG. 5 is a diagram illustrating an example of a method for calculating the timing of a peak of the light amount of the flickering light source, which is an example of the timing of a feature point of the flicker.

A point where the maximum value among AE(1) to AE (12) is obtained will be denoted by P2(t(m),AE(m)). The point of one before the light metering result will be denoted by P1(t(m−1),AE(m−1)). The point of the next light metering result will be denoted by P3(t(m+1),AE(m+1)). The ICPU 112 determines a straight line L1 that passes through two points including the point having a smaller value between AE(m−1) and AE(m+1) (in the example of FIG. 5, P1) and the point P2 as L1=at+b. A straight line that passes through the point having a greater value between AE(m−1) and AE (m+1) (in the example of FIG. 5, P3) and has a gradient of −a will be denoted by L2. The ICPU 112 can determine the intersection of the lines L1 and L2 to calculate peak timing t_peak with the start time of the accumulation for flicker detection as 0 ms, and a peak light metering value AE_peak corresponding to the light amount at the peak timing t_peak.

In FIG. 5, the method for calculating the timing when the periodically changing light amount of the flickering light sources becomes maximum (peak) is described as an example of the method for calculating the timing of a feature point of the flicker. However, the ICPU 112 may calculate the timing when the light amount becomes minimum (bottom).

Figure 6:
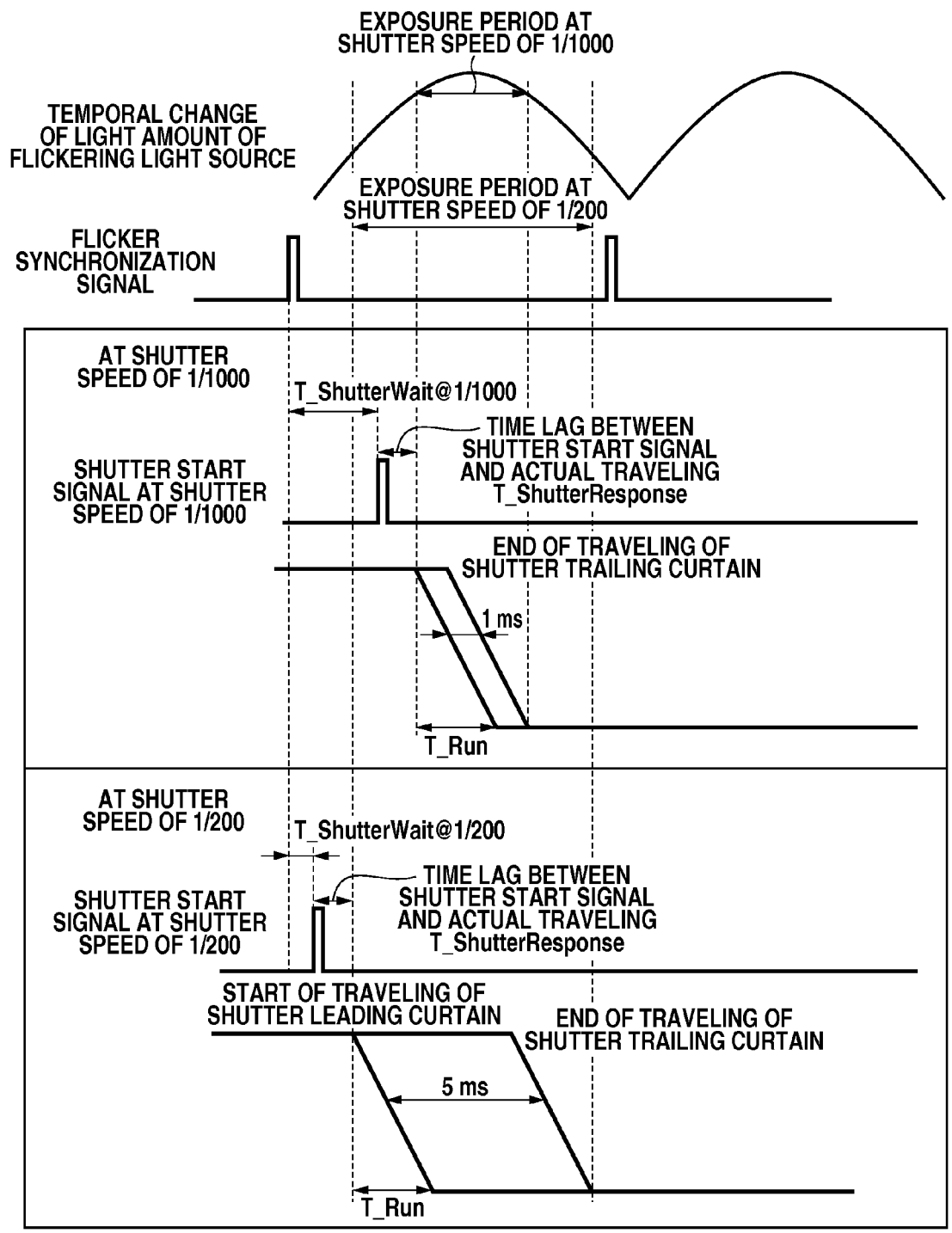
FIG. 6 is a diagram illustrating a relationship between a light amount change of the flickering light source and generation timing of a flicker synchronization signal and a shutter start signal.

In step S104, the camera microcomputer 101 generates a flicker synchronization signal serving as a reference signal based on the flicker frequency and the timing of the light amount change determined in step S103. As illustrated in FIG. 6, the flicker synchronization signal is a signal that is repeatedly generated in each cycle of the light amount change of the flickering light source. The flicker synchronization signal is synchronized with predetermined timing of the light amount change of the flickering light source. FIG. 6 is a diagram illustrating a relationship between the light amount change of the flickering light source and occurrence timing (generation timing) of the flicker synchronization signal and a shutter start signal.

In FIG. 6, a time lag between the shutter start signal and when the shutter 104 travels actually to start exposing a first region of the imaging area of the image sensor 103 to start to be exposed (hereinafter, referred to as a first line) is denoted by T_ShutterResponse. A time between when the first line of the imaging area of the image sensor 103 starts being exposed and when a last region to start to be exposed (hereinafter, referred to as a last line) starts being exposed is denoted by T_Run. When simultaneously starting to expose the entire imaging area of the image sensor 103, T_Run=0.

With the start time of the accumulation for flicker detection as 0 ms, timing t_Flicker to generate the flicker synchronization signal is given by the following equation (3).

$$t\_Flicker = t\_peak - T\_ShutterResponse - (T\_Run + TVmax)/2 + T \times n. \quad (3)$$

T is the, and t_peak is. The light amount change cycle of the flickering light source T and the peak timing with the start time of the accumulation for flicker detection as 0 ms t_peak are calculated in step S103. "n" is a natural number. TVmax is a shutter speed serving as a threshold whether to perform shutter control for reducing the influence of flicker. "n" and TVmax are set in advance.

If the shutter speed Tv is slower than 1/100 seconds, exposure is performed for a period longer than or equal to one light amount change cycle of the flickering light source. This reduces the influence of flicker. If the shutter speed Tv is so faster that the exposure period does not reach but is close to one light amount change cycle of the flickering light source, the influence of flicker is also considered to be relatively small. In the present exemplary embodiment, the camera microcomputer 101 performs the shutter control for reducing the influence of flicker if the shutter speed Tv is faster than 8 ms. TVmax is thus set at 1/125 (seconds).

The camera microcomputer 101 further sets T_ShutterWait, which is a wait time (time difference) between the flicker synchronization signal and the shutter start signal for instructing the shutter 104 to start traveling. The camera microcomputer 101 performs control so that timing when the light amount of the flickering light source reaches or exceeds a predetermined value comes to the center of the period between when the first line of the imaging area of the image sensor 103 starts being exposed and when the last line finishes being exposed. The timing when the light amount of the flickering light source reaches or exceeds the predetermined value corresponds to timing when the light amount change of the light from the object within a predetermined period falls below a predetermined value. Here, the camera microcomputer 101 changes T_ShutterWait according to the shutter speed Tv. For example, the camera microcomputer 101 sets T_ShutterWait as expressed in equation (4).

$$T\_ShutterWait = (TVmax - Tv)/2, \quad (4)$$

where Tv<1/125.

By setting T_ShutterWait as described above, the camera microcomputer 101 can control the timing of the peak of the light amount of the flickering light source to come to the center of the period between when the first line of the imaging area of the image sensor 103 starts being exposed and when the last line finishes being exposed. In other words, the camera microcomputer 101 performs shutter control so that the center timing of the period between when the first region of the imaging area of the image sensor 103 to start to be exposed starts being exposed and when the last region to start to be exposed finishes being exposed coincides with timing when the light from the object satisfies a predetermined condition. More specifically, the shutter control includes determining start timing to start an operation for changing the state of the shutter 101 from the light-shielding state to the retracted state (the generation timing of the shutter start signal) and making the shutter 104 travel.

FIG. 7 is a diagram illustrating a table in which values of T_ShutterWait and values of the shutter speed Tv are associated with each other. A table such as illustrated in FIG. 7 may be stored in the memory 102 in advance. A plurality of pieces of information about the time difference between the generation timing of the reference signal and the start timing of the shutter traveling may be associated with any of a plurality of settable exposure times and stored in advance without using a table. Information about the time difference between the generation timing of the reference signal and the start timing of the shutter traveling corresponding to a reference exposure time may be stored in advance, and the stored information may be corrected for use based on a difference between a set exposure time and the reference exposure time.

In the example described above, the timing of the peak of the light amount of the flickering light source is described to be calculated in step S103. The generation timing of the flicker synchronization signal is set based on the timing of the peak of the light amount of the flickering light source. However, the generation timing of the flicker synchronization signal may be set based on the timing of a bottom of the light amount of the flickering light source. The camera microcomputer 101 may control the timing when the light amount of the flickering light source falls below a predetermined value to come to the center of the period between when the first line of the imaging area of the image sensor 103 starts being exposed and when the last line finishes being exposed. In such a case, similarly to the timing when the light amount of the flickering light source reaches or exceeds a predetermined value, the timing when the light amount of the flickering light source falls below a predetermined value corresponds to the timing when the light amount change of the light from the object within a predetermined period falls below a predetermined value.

In step S105, the camera microcomputer 101 determines whether the user operates a release button and a switch SW2 of the operation unit 114 for giving an instruction to start an imaging operation is ON. If the switch SW2 is not ON (NO in step S105), the processing returns to step S101. The imaging apparatus then repeats the series of operations of steps S101 to S104 to update the light amount change cycle of the flickering light source and the timing of the peak of the light amount of the flickering light source. Even if the light amount change cycle of the flickering light source fluctuates by ±0.4 Hz, the series of operations of steps S101 to S104 can be repeated at cycles of, e.g., approximately 100 ms to suppress a deviation of the light amount change cycle within 100 ms to approximately ±0.4 ms at the maximum. This enables the shutter control for accurately reducing the influence of flicker regardless of when the switch SW2 is turned ON.

Instead of simply repeating the operations of steps S101 to S104, the imaging apparatus may perform the light metering operation of step S101 and the flicker detection operation of steps S102 to S104 in different cycles. As described above, the flicker detection operation can be satisfactorily performed in cycles of approximately 100 ms. To improve response to a luminance change of the object, the light metering operation may be performed in cycles shorter than those of the flicker detection operation, such as in cycles of approximately 50 ms.

If the switch SW2 is ON (YES in step S105), the processing proceeds to step S106. In step S106, the camera microcomputer 101 generates the shutter start signal with a delay of T_ShutterWait according to the determined shutter speed Tv with respect to the first flicker synchronization signal after the switch SW2 is turned ON. According to the generated shutter start signal, the shutter 104 is then driven to perform imaging.

As described above, the shutter control for reducing the influence of flicker includes delaying the shutter start signal with respect to the flicker synchronization signal by T_ShutterWait according to the shutter speed Tv. Consequently, as illustrated in FIG. 6, the timing of the peak of the light amount of the flickering light source comes to the center of the period between when the first line of the imaging area of the image sensor 103 starts being exposed and when the last line finishes being exposed, regardless of whether the shutter speed Tv is ¹/₁₀₀₀ seconds or ¹/₂₀₀ seconds. Such control of the imaging timing based on the timing of a feature point of flicker can reduce exposure nonuniformity within an image due to the influence of the flicker.

Figure 9A:
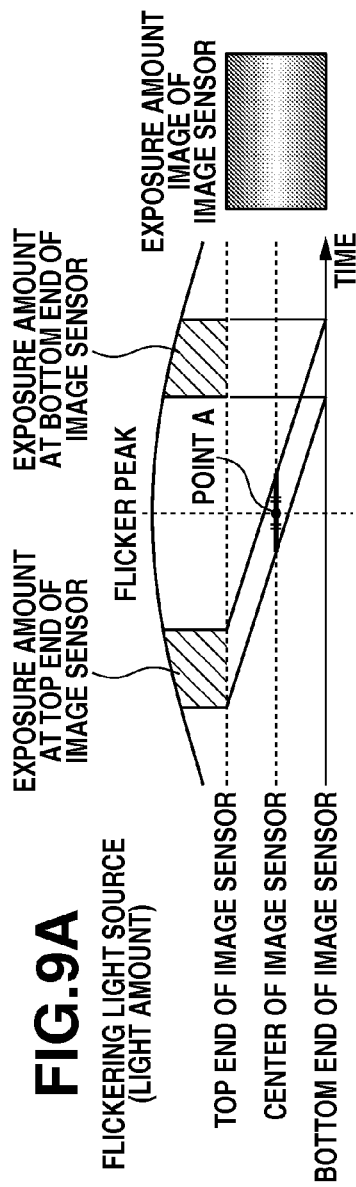
FIGS. 9A, 9B, and 9C are diagrams illustrating an exposure amount in a case where a shutter has a linear traveling characteristic and the exposure amount in a case where the shutter has a curved traveling characteristic.
Figure 9B:
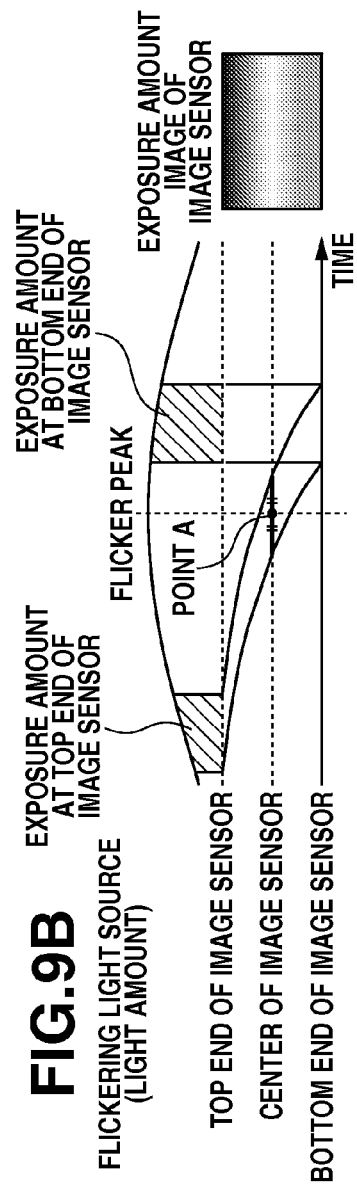
Figure 9C:
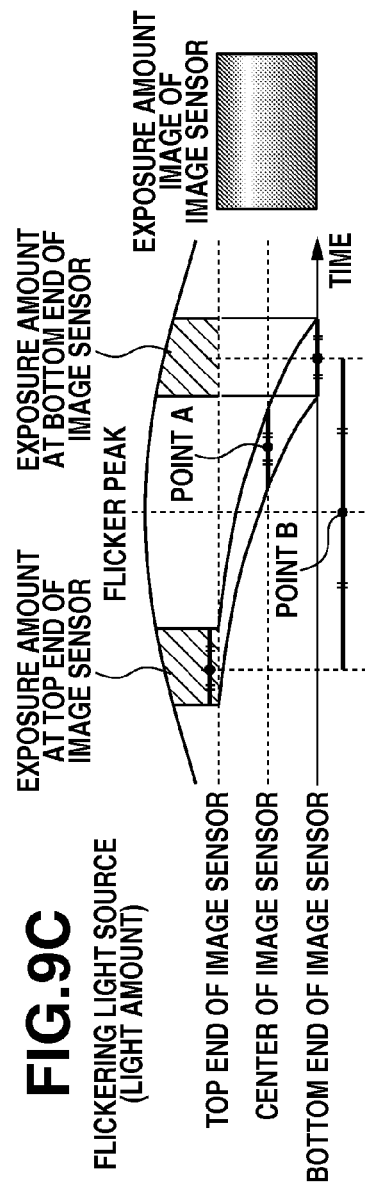

In FIG. 6, the shutter 104 is described to have a linear traveling characteristic (constant moving speed). However, the shutter 104 may be configured in such a manner that its traveling characteristic traces a curve (the moving speed changes during movement). In a case of, for example, a mechanical shutter that travels from above to below the image sensor 103, since the leading and trailing curtains of the shutter each have mass, the shutter started to move downward accelerates gradually by the influence of gravity, and the traveling characteristic traces a curve. FIGS. 9A, 9B, and 9C illustrate exposure amounts when the shutter 104 has a linear traveling characteristic, and when the shutter 104 has a curved traveling characteristic. FIG. 9A illustrates the exposure amount when the shutter 104 has a linear traveling characteristic and the timing when the light amount of the flickering light source reaches or exceeds a predetermined value is controlled to come to the center of the period between when the first line of the imaging area of the image sensor 103 starts being exposed and when the last line finishes being exposed. In the following description, the first line of the imaging area of the image sensor 103 (the first region of the imaging area to start to be exposed) will be referred to as a top end of the imaging sensor 103. The last line of the imaging area (the last region of the imaging area to start to be exposed) will be referred to as a bottom end of the image sensor 103. A line at the center between the first and last lines of the imaging area will be referred to as a center of the image sensor 103. Movement characteristics of the shutter 104 include not only change characteristics of the moving speed of the shutter 104 such as the above-described traveling characteristic, but also information about the movement of the shutter 104 such as the time needed for the shutter 104 to move from the first line to the last line of the imaging area of the image sensor 103.

FIG. 9A illustrates a case where the shutter 104 has a linear traveling characteristic. In such a case, the exposure amounts at the top and bottom ends of the image sensor 103 coincide with each other if a center point A of the exposure period at the center of the image sensor 103 is adjusted to the timing when the light amount of the flickering light source reaches or exceeds the predetermined value. This minimizes exposure nonuniformity within the image. Since the exposure amount becomes maximum at the center of the image sensor 103, the change of the exposure amount from the center to the upper side of the image sensor 103 is approximately the same as that of the exposure amount from the center to the lower side.

FIG. 9B illustrates the exposure amount when the shutter 104 has a curved traveling characteristic and the center point A of the exposure period at the center of the image sensor 103 is adjusted to timing when the light amount change of the flickering light source is small. In the examples illustrated in FIGS. 9B and 9C, the leading and trailing curtains of the shutter 104 have approximately the same traveling characteristics, so that exposure nonuniformity resulting from a difference between the traveling characteristics will not affect the image (an exposure difference is smaller than a predetermined value).

As illustrated in FIG. 9B, if the shutter 104 has a curved traveling characteristic, the time needed for the shutter 104 to travel from the top end to the center of the image sensor 103 is different from the time needed for the shutter 104 to travel from the center to the bottom end of the image sensor 103. The exposure amount at the center of the image sensor 103 becomes maximum. The exposure amounts at the top and bottom ends of the image sensor 103 do not coincide with each other, and exposure nonuniformity within the image increases as compared to the image illustrated in FIG. 9A. If the shutter 104 has a curved traveling characteristic, the camera microcomputer 101 controls the imaging timing as illustrated in FIG. 9C. In FIG. 9C, the microcomputer 101 performs control so that a point B, or center timing of the period from the center of the exposure period of the top end of the image sensor 103 to the center of the exposure period of the bottom end of the image sensor 103, is adjusted to the timing when the light amount of the flickering light source reaches or exceeds the predetermined value. In other words, the camera microcomputer 101 performs exposure control of the image sensor 103 based on the movement characteristics of the shutter 104 and the calculated light amount change characteristic of the light from the object. More specifically, the camera microcomputer 101 performs the exposure control of the image sensor 103 so that the center timing of the period between when the first region of the imaging area of the image sensor 103 to start to be exposed starts being exposed and when the last region of the imaging area of the image sensor 103 to start to be exposed finishes being exposed coincides with the timing when the light from the object satisfies the predetermined condition. The camera microcomputer 101 further performs the exposure control of the image sensor 103 so that the center timing of the exposure period of the center region of the imaging area of the image sensor 103 differs from the timing when the light from the object satisfies the predetermined condition. In other words, the camera microcomputer 101 performs the exposure control of the image sensor 103 so that the center timing of the exposure period of a region that starts to be exposed before the center region of the imaging area of the image sensor 103 coincides with the timing when the light from the object satisfies the predetermined condition. Such control does not maximize the exposure amount at the center of the image sensor 103, but can minimize exposure nonuniformity within the image because the exposure amounts at the top and bottom ends of the image sensor 103 coincide with each other.

Now, the relationship between the light amount change of the flickering light source and the generation timing of the flicker synchronization signal and the shutter start signal will be described with reference to FIG. 10. FIG. 10 illustrates an example where the flicker synchronization signal is synchronized with the timing when the light amount of the flickering light source becomes maximum. However, the flicker synchronization signal may be synchronized with timing when the light amount of the flickering light source becomes minimum. The flicker synchronization signal may be synchronized with other predetermined timing.

As described above, the shutter 104 does not start to travel immediately after the reception of the shutter start signal, but actually starts to travel after the time lag T_ShutterResponse. To adjust the traveling timing of the shutter 104 so that the timing when the light amount change of the flickering light source is small coincides with the point B, the shutter start signal needs to be issued ahead of the flicker synchronization signal as much as in consideration of T_ShutterResponse. For that purpose, the time between the points S and B illustrated in FIG. 10 may be stored into the imaging apparatus (memory 102) in advance as a design value. Imaging apparatuses may have individual differences in T_ShutterResponse. To adjust the point B more accurately to the timing when the light amount change of the flickering light source is small, the time between the points S and B may therefore be stored into the imaging apparatus as an adjustment value in the factory. The higher the shutter speed Tv, the more significant the influence of flicker. The time between the points S and B at a maximum operable shutter speed TV_Max of the shutter 104 may be stored as a design value or an adjustment value that is actually measured and stored. For adjustment, times at five points including time points S, C, E, D, and F are measured. The time point S refers to when the shutter start signal is issued. The time point C refers to when the leading curtain reaches the top end of the image sensor 103. The time point E refers to when the leading curtain reaches the bottom end of the image sensor 103. The time point D refers to when the trailing curtain reaches the top end of the image sensor 103. The time point F refers to when the trailing curtain reaches the bottom end of the image sensor 103. The time SB between the points S and B can be calculated from the five measured times by using the following equation (5).

$$SB = (C - S) + \frac{(D - C)}{2} + \left\{ \frac{\left\{E + \frac{(F - E)}{2}\right\} - \left\{C + \frac{(D - C)}{2}\right\}}{2} \right\}. \quad (5)$$

The calculated value can be stored into the imaging apparatus.

In actual imaging, the shutter speed Tv is not necessarily TV_Max. When performing imaging at a shutter speed Tv slower than TV_Max in synchronization with the timing when the light change amount of the flickering light source is small, correction is needed as much as the difference in the shutter speed Tv. Since the flicker synchronization signal is synchronized with the timing when the light amount of the flickering light source becomes maximum, the flicker synchronization signal is output at a time t_peak+(m×T) (m is an arbitrary natural number). The shutter start signal may be output ahead of the flicker synchronization signal by the time SB and the amount of correction for the shutter speed Tv. The time point S to output the shutter start signal is thus determined from the time SB and the shutter speed Tv at the time of imaging by the following equation (6).

$$S = \text{t\_peak} + (m \times T) - SB - \frac{(Tv - \text{TV\_Max})}{2}. \quad (6)$$

Since the traveling characteristic of the shutter 104 is affected by the gravity, the traveling characteristic may change with the orientation of the imaging apparatus. To accommodate such a change, the time SB may be stored for each orientation of the imaging apparatus. For example, a plurality of adjustment values corresponding to respective different orientations, such as time SB(normal) for a normal position and time SB(vertical) for a vertical position, is separately stored in the memory 102. When calculating the time point S to output the shutter start signal in actual imaging, the camera microcomputer 101 may detect the orientation of the imaging apparatus from an output of an orientation sensor included in the imaging apparatus or from an external input, and use the value of the time SB of the corresponding orientation. If the value of the time SB used by the camera microcomputer 101 changes, the imaging area of the image sensor 103 of which the exposure period overlaps the timing when the light from the object satisfies the predetermined condition changes. The camera microcomputer 101 then changes the imaging area of the image sensor 103 to be exposed according to the timing when the light from the object satisfies the predetermined condition, depending on the orientation of the imaging apparatus.

In the example described above, the time SB between the points S and B in FIG. 10 is described to be stored as an adjustment value. In a modification, the time SA between the points S and A in FIG. 10 may be stored in the imaging apparatus as a design value or an adjustment value that is actually measured and stored. For adjustment, the times of a time point G at which the leading curtain reaches the center of the image sensor 103 and a time point H at which the trailing curtain reaches the center of the image sensor 103 are measured. Then, the time SA can be calculated by the following equation (7).

$$SA = (G - S) + \frac{(H - G)}{2}. \quad (7)$$

To use the time SA, the time between the points A and B in FIG. 10 is stored into the imaging apparatus (memory 102) in advance as a design value or as an adjustment value Δ based on the traveling characteristic of the shutter 104. The time point S to output the shutter start signal can be calculated by the following equation (8).

$$S = \text{t\_peak} + (m \times T) - SA - \frac{(Tv - \text{TV\_Max})}{2} + \Delta. \quad (8)$$

After the end of the imaging, then in step S107, the camera microcomputer 101 determines whether to perform continuous imaging. The camera microcomputer 101 may determine whether to perform continuous imaging based on whether the switch SW2 is maintained ON, or based on whether a continuous imaging mode is selected as the operation mode.

If the continuous imaging is not to be performed (NO in step S107), the processing returns to step S101. If the continuous imaging is to be performed (YES in step S107), the processing proceeds to step S108.

In step S108, the camera microcomputer 101 determines whether there is flicker. Here, the camera microcomputer 101 can use the determination result of step S103. If there is no flicker (NO in step S108), the processing proceeds to step S109. If there is flicker (YES in step S108), the processing proceeds to step S110.

An operation sequence between frames of continuous imaging (between images when performing continuous imaging) will be described with reference to FIGS. 8A and 8B. FIGS. 8A and 8B are diagrams illustrating the operation sequence of the light metering sensor 108 and the ICPU 112 between frames of continuous imaging. FIG. 8A illustrates a case where there is no flicker. FIG. 8B illustrates a case where there is flicker. In step S109, the light metering sensor 108 and the ICPU 112 operate as illustrated in FIG. 8A. In step S110, the light metering sensor 108 and the ICPU 112 operate as illustrated in FIG. 8B.

First, the operation sequence of the light metering sensor 108 and the ICPU 112 between frames of continuous imaging without flicker will be described with reference to FIG. 8A.

The half mirror 105 which has been in the mirror-up state to guide a light flux to the image sensor 103 during imaging moves to the mirror-down state to guide the light flux to the light metering sensor 108 after the imaging. Immediately after the movement from the mirror-up state to the mirror-down state, the half mirror 105 makes a bound (hereinafter, referred to as a mirror bound) due to the impact of the stop of the movement. The mirror bound converges and the half mirror 105 enters a stable mirror-down state. The light metering sensor 108 performs accumulation of charges for obtaining the image signal to be used for light metering and object tracking (hereinafter, referred to as accumulation for automatic exposure (AE) and tracking) and reading of the image signal. The reading of the image signal associated with the accumulation for AE and tracking can be performed in a short time to increase the frame speed (continuous imaging speed) of the continuous imaging. If a CCD image sensor is used as the light metering sensor 108, the foregoing pixel addition readout is performed. If a CMOS image sensor is used as the light metering sensor 108, the above-described thinning readout is performed. The ICPU 112 then performs a calculation related to object tracking (hereinafter, referred to as a tracking calculation) and a light metering calculation based on the obtained image signal.

After the reading of the image signal associated with the accumulation for AE and tracking, the light metering sensor 108 performs accumulation of charges for obtaining the image signal to be used for face detection of an object (hereinafter, referred to as accumulation for face detection) and reading of the image signal. To perform accurate face detection, the reading of the image signal associated with the accumulation for face detection is performed so that fewer pixels are added by pixel addition readout or fewer lines are thinned by thinning readout than in the reading of the image signal associated the accumulation for AE and tracking. In the present exemplary embodiment, the light metering sensor 108 performs full-pixel readout without pixel addition readout or thinning readout. The ICPU 112 then performs a calculation related to the face detection of an object (hereinafter, referred to as face detection calculation) based on the obtained image signal. The result of the face detection calculation is used for the subsequent tracking calculation and light metering calculation. For example, the ICPU 112 performs the tracking calculation by using a face area of an object detected by the face detection calculation as a tracking object. The ICPU 112 performs the light metering calculation with a higher weight on the face area of the object detected by the face detection calculation.

To increase the frame speed (continuous imaging speed) of the continuous imaging, the light metering sensor 108 may desirably perform the accumulation for face detection in parallel with the tracking calculation and the light metering calculation by the ICPU 112. The reading of the image signal associated with the accumulation for face detection may be performed without the light flux guided to the light metering sensor 108. To increase the frame speed (continuous imaging speed) of the continuous imaging, the reading of the image signal associated with the accumulation for face detection may desirably be performed while the half mirror 105 is moved to the mirror-up state.

When the mirror bound subsequent to the movement converges and the half mirror 105 enters a stable mirror-up state, the next imaging (exposure) is performed.

If there is no flicker, the imaging apparatus performs continuous imaging according to such an operation sequence until the ON state of the switch SW2 is cancelled. More specifically, the imaging apparatus does not perform accumulation of charges or reading of the image signal for flicker detection (hereinafter, referred to as accumulation and read for flicker detection). The imaging apparatus does not perform new flicker detection or calculate timing of a feature point of flicker.

Next, the operation sequence of the light metering sensor 108 and the ICPU 112 between frames of continuous imaging with flicker will be described with reference to FIG. 8B.

After the mirror bound converges and the half mirror 105 enters a stable mirror-down state, the light metering sensor 108 performs accumulation and read for flicker detection. The light metering sensor 108 performs the accumulation and read for flicker detection by a method similar to that described in step S102 of FIG. 2.

It is unlikely for the flickering light source to be replaced with another one having a different flicker frequency during continuous imaging. The frequency serving as a reference of the flicker frequency during continuous imaging may be considered to be constant. Therefore, the number of times of charge accumulation for flicker detection can be made smaller than in step S102 of FIG. 2 as long as the timing of the peak of the light amount of the flickering light source can be calculated. For example, the timing of the peak of the light amount of the flickering light source can be calculated from at least a number of times of accumulation equivalent to one light amount change cycle of the flickering light source. If the light amount change cycle of the flickering light source is approximately 8.33 ms, the timing of the peak of the light amount of the flickering light source can be accurately calculated by performing the accumulation five times or more. If the light amount change cycle of the flickering light source is approximately 10 ms, the timing can be accurately calculated by performing the accumulation six times or more. In such a manner, a drop in the frame speed (continuous imaging speed) of the continuous imaging can be suppressed by performing simple accumulation for flicker detection for calculating the timing of the peak of the light amount of the flickering light source between the frames of the continuous imaging.

The ICPU 112 then performs a flicker detection calculation based on the obtained image signal. The ICPU 112 performs the flicker detection calculation by a method similar to that described in step S103 of FIG. 3. As described above, the frequency serving as the reference of the flicker frequency during the continuous imaging can be considered to be constant. The ICPU 112 may thus calculate only the timing of the peak of the light amount of the flickering light source without determining the light amount change cycle of the flickering light source. At that time, the ICPU 112 calculates the timing of the feature point of the flicker indicated by the latest one of the detection results.

After the end of the flicker detection calculation, the camera microcomputer 101 updates the flicker synchronization signal based on the detection result of the flicker detection calculation. More specifically, the camera microcomputer 101 controls the imaging timing based on the latest timing of the feature point of the flicker calculated after the previous imaging.

After the end of the accumulation and read for flicker detection, the light metering sensor 108 performs the accumulation for AE and tracking and the reading of the image signal. To increase the frame speed (continuous imaging speed) of the continuous imaging, the light metering sensor 108 may desirably perform the accumulation for AE and tracking in parallel with the flicker detection calculation by the ICPU 112.

The subsequent accumulation for face detection and various calculations are similar to those without flicker, described with reference to FIG. 8A. A description thereof will thus be omitted.

After the end of the light metering calculation, the camera microcomputer 101 generates the shutter start signal with a delay of T_ShutterWait according to the shutter speed Tv, determined based on the result of the latest light metering calculation, with respect to the latest flicker signal, and the next imaging is performed.

If there is flicker, the imaging apparatus performs continuous imaging according to such an operation sequence until the ON state of the switch SW2 is cancelled.

As described above, according to an exemplary embodiment of the present inventions, even if the commercial power supply frequency has some fluctuations, the imaging apparatus calculates the timing of the peak of the light amount of the flickering light source between frames of continuous imaging, and performs each imaging operation according to the timing of the calculated peak. The imaging apparatus can thus obtain favorable images.

In the above-described exemplary embodiment, the imaging apparatus is described to include the half mirror 105 and the light metering sensor 108 for performing accumulation for various uses when the half mirror 105 is in the mirror-down state between frames of continuous imaging. However, the imaging apparatus may be configured not to include the half mirror 105. In such a case, the light metering sensor 108 may not be included. The image sensor 103 may perform accumulation for various uses similar to that of the light metering sensor 108.

The order of various types of accumulation by the light metering sensor 108 illustrated in FIGS. 8A and 8B is just an example. The light metering sensor 108 may perform various types of accumulation in a different order.

In FIGS. 8A and 8B, the accumulation of charges for obtaining the image signal to be used for light metering and the accumulation of charges for obtaining the image signal to be used for object tracking are integrated into one accumulation operation. However, the light metering sensor 108 may be configured to separately perform the two types of accumulations.

The imaging apparatus may be configured not to perform object tracking or face detection of an object as long as the imaging apparatus is configured not to perform the accumulation for flicker detection if there is no flicker, and to perform the accumulation for flicker detection if there is flicker, between frames of continuous imaging. If there is flicker, the imaging apparatus performs the accumulation for flicker detection, which decreases the frame speed of the continuous imaging as compared to that when there is no flicker. This, however, can accurately reduce the influence of flicker, so that favorable images can be obtained even by imaging under a flickering light source. On the other hand, if there is no flicker, the absence of the accumulation for flicker detection can prevent the frame speed of the continuous imaging from being unnecessarily lowered.

In the above-described exemplary embodiment, the camera microcomputer 101 is described to perform the exposure control of the image sensor 103 by adjusting the movement start timing of the shutter 104. However, the camera microcomputer 101 may be configured to perform the exposure control of the image sensor 103 by adjusting charge reset timing (electronic shutter) of the image sensor 103. For example, the imaging apparatus may be configured not to use a mechanical shutter but to use an electronic shutter as the leading curtain of the shutter 104. For example, a method discussed in Japanese Patent Application Laid-Open No. 2007-053742 may be used as a method for controlling the electronic shutter. More specifically, when starting to expose regions of the image sensor 103 sequentially so that differences in the exposure start timing between the neighboring regions of the image sensor 103 are not constant, the camera microcomputer 101 may perform the exposure control of the image sensor 103 so that the center timing of the exposure period of the center region of the imaging area of the image sensor 103 differs from the timing when the light from the object satisfies a predetermined condition.

The above-described exemplary embodiments of the present inventions may be implemented by performing the following processing. The processing includes supplying software (program) for implementing the functions of the present exemplary embodiment to a system or an apparatus via a network or various storage media, and reading and executing the program by a computer (or CPU or micro processing unit (MPU)) of the system or apparatus.

The exemplary embodiments of the present inventions have been described above. However, the present inventions are not limited to such exemplary embodiments, and various modifications and changes may be made without departing from the gist thereof.

Other Embodiments

Embodiment(s) of the present inventions can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-089532, filed Apr. 23, 2014, which is hereby incorporated by reference herein in its entirety.

What is claimed is:

1. An imaging apparatus comprising:
   an image sensor;
   a shutter configured to be movable to a position at which the image sensor is shielded from light, and to a position at which the image sensor is not shielded from light, wherein a moving speed of the shutter changes during movement; and
   at least one processor that operates to:
   calculate a light amount change characteristic of light from an object; and
   perform exposure control of the image sensor based on a movement characteristic of the shutter and the calculated light amount change characteristic so that a center timing of an exposure period of a center region of an imaging area of the image sensor differs from a timing when the light from the object satisfies a predetermined condition, the light being calculated by the at least one processor,
   wherein the timing when the light from the object satisfies the predetermined condition is included in an exposure period of the image sensor.

2. The imaging apparatus according to claim 1, wherein the at least one processor is configured to perform the exposure control of the image sensor so that a center timing of a period between when a first region of the imaging area of the image sensor to start to be exposed starts being exposed and when a last region of the imaging area of the image sensor to start to be exposed finishes being exposed coincides with the timing when the light from the object satisfies the predetermined condition, the light being calculated by the at least one processor.

3. The imaging apparatus according to claim 1,
   wherein the moving speed of the shutter increases gradually during the movement, and
   wherein the at least one processor is configured to perform the exposure control of the image sensor so that a center timing of an exposure period of a region to start to be exposed before a center region of the imaging area of the image sensor coincides with the timing when the light from the object satisfies the predetermined condition, the light being calculated by the at least one processor.

4. The imaging apparatus according to claim 1, wherein the at least one processor is configured to perform the exposure control of the image sensor by adjusting a movement start timing of the shutter.

5. The imaging apparatus according to claim 1, wherein the at least one processor is configured to perform the exposure control of the image sensor by adjusting a charge reset timing of the image sensor.

6. The imaging apparatus according to claim 1, wherein the timing when the light from the object satisfies the predetermined condition is a timing when a light amount of the light from the object becomes maximum, in a periodic light amount changing of the light.

7. An imaging apparatus comprising:
an image sensor;
a shutter configured to be movable to a position at which the image sensor is shielded from light, and to a position at which the image sensor is not shielded from light, wherein a moving speed of the shutter changes during movement; and
at least one processor that operates to:
calculate a timing when a light from an object satisfies a predetermined condition; and
perform exposure control of the image sensor,
wherein the at least one processor is configured to change an imaging area of the image sensor to be exposed according to the timing when the light from the object satisfies the predetermined condition, according to an orientation of the imaging apparatus.

8. The imaging apparatus according to claim 7, wherein the at least one processor is configured to perform the exposure control of the image sensor by adjusting a movement start timing of the shutter.

9. The imaging apparatus according to claim 7, wherein the at least one processor is configured to perform the exposure control of the image sensor by adjusting a charge reset timing of the image sensor.

10. The imaging apparatus according to claim 7, further comprising a storage configured to store a plurality of adjustment values corresponding to respective, different orientations of the imaging apparatus,
wherein the at least one processor is configured to perform the exposure control of the image sensor by using an adjustment value corresponding to the orientation of the imaging apparatus from among the plurality of adjustment values stored in the storage.

11. The imaging apparatus according to claim 10, wherein the at least one processor is configured to perform the exposure control of the image sensor by adjusting a movement start timing of the shutter, and
wherein the adjustment value is an adjustment value for adjusting the movement start timing of the shutter.

12. The imaging apparatus according to claim 7, wherein the timing when the light from the object satisfies the predetermined condition is a timing when a light amount of the light from the object becomes maximum in a periodic light amount changing of the light.

13. An imaging apparatus comprising:
an image sensor; and
at least one processor that operates to:
calculate a timing when a light from an object satisfies a predetermined condition; and
perform exposure control of the image sensor,
wherein the at least one processor is configured to start to expose regions of the image sensor at a different timing for each region of the regions of the image sensor,
wherein the at least one processor is configured to, in a case of starting to expose the regions of the image sensor sequentially so that differences in exposure start timing between neighboring regions of the image sensor are not constant, perform the exposure control of the image sensor so that a center timing of an exposure period of a center region of an imaging area of the image sensor differs from the timing when the light from the object satisfies the predetermined condition, and
wherein the timing when the light from the object satisfies the predetermined condition is included in an exposure period of the image sensor.

14. The imaging apparatus according to claim 13, further comprising a shutter configured to be movable to a position at which the image sensor is shielded from light and to a position at which the image sensor is not shielded from light, wherein a moving speed of the shutter changes during movement, and
wherein the at least one processor is configured to perform the exposure control of the image sensor by adjusting a movement start timing of the shutter.

15. The imaging apparatus according to claim 14,
wherein the at least one processor is configured to perform the exposure control of the image sensor by adjusting a movement start timing of the shutter based on a length of an exposure time for the image sensor.

16. The imaging apparatus according to claim 13, wherein the at least one processor is configured to perform the exposure control of the image sensor by adjusting a charge reset timing of the image sensor.

17. The imaging apparatus according to claim 13, wherein the timing when the light from the object satisfies the predetermined condition is a timing when a light amount of the light from the object becomes maximum in a periodic light amount changing of the light.

18. An exposure control method of an imaging apparatus including an image sensor, and a shutter configured to be movable to a position at which the image sensor is shielded from light and to a position at which the image sensor is not shielded from light, wherein a moving speed of the shutter changes during movement, the exposure control method comprising:
calculating a light amount change characteristic of light from an object; and
performing exposure control of the image sensor of the imaging apparatus based on a movement characteristic of the shutter of the imaging apparatus and the calculated light amount change characteristic so that a center timing of an exposure period of a center region of the imaging area of the image sensor differs from a timing when the light from the object satisfies a predetermined condition, the light being calculated by the calculating,
wherein the timing when the light from the object satisfies the predetermined condition is included in an exposure period of the image sensor.

19. An exposure control method of an imaging apparatus including an image sensor, and a shutter configured to be movable to a position at which the image sensor is shielded from light and to a position at which the image sensor is not shielded from light, wherein a moving speed of the shutter changes during movement, the exposure control method comprising:

calculating a timing when a light from an object satisfies a predetermined condition; and performing exposure control of the image sensor of the imaging apparatus, wherein an imaging area of the image sensor to be exposed is changed according to the timing when the light from the object satisfies the predetermined condition, according to an orientation of the imaging apparatus.

20. The exposure control method according to claim 19, wherein the timing when the light from the object satisfies the predetermined condition is a timing when a light amount of the light from the object becomes maximum in a periodic light amount changing of the light.

21. An exposure control method of an imaging apparatus including an image sensor, the exposure control method comprising:

calculating a timing when a light from an object satisfies a predetermined condition; and performing exposure control of the image sensor of the imaging apparatus, wherein each region of a plurality of regions of the image sensor is started to be exposed at a different timing for each of the regions, wherein, if the regions of the image sensor are started to be exposed sequentially so that differences in exposure start timing between neighboring regions of the image sensor are not constant, the exposure control of the image sensor is performed so that a center timing of an exposure period of a center region of an imaging area of the image sensor differs from the timing when the light from the object satisfies the predetermined condition, and wherein the timing when the light from the object satisfies the predetermined condition is included in an exposure period of the image sensor.

22. The exposure control method according to claim 21, wherein the timing when the light from the object satisfies the predetermined condition is a timing when a light amount of the light from the object becomes maximum in a periodic light amount changing of the light.

* * * * *